April 14, 1931.  J. KUUSINEN ET AL  1,800,735

ELECTRIC POWER PLANT PROVIDED WITH AUTOMATIC VOLTAGE REGULATION

Filed Oct. 11, 1929

Jarl Kuusinen and
Arle Ytterberg.
per W. Wallace White.
Attorney.

Patented Apr. 14, 1931

1,800,735

UNITED STATES PATENT OFFICE

JARL KUUSINEN, OF HAGA, FINLAND, AND ARLE YTTERBERG, OF HOGBERGET, SWEDEN, ASSIGNORS TO ALLMÄNNA SVENSKA ELEKTRISKA AKTIEBOLAGET, OF VASTERAS, SWEDEN, A CORPORATION OF SWEDEN

ELECTRIC POWER PLANT PROVIDED WITH AUTOMATIC VOLTAGE REGULATION

Application filed October 11, 1929, Serial No. 398,887, and in Sweden October 13, 1928.

Automatic voltage regulators for electric generators are sometimes provided with so-called compounding impedances, that is, impedances which are traversed by the load current, while the voltage between their terminals is combined with the machine voltage to a resultant voltage, which is caused to act on the voltage coil of the regulator. In this way the regulator can be caused to keep the voltage constant at another point than at the machine terminals, for instance at a certain point of an outgoing line. According to the present invention, generating stations having two or more generators are provided with individual compounding impedances for each generator traversed by the outgoing line currents or by currents proportional to these.

Figure 1:
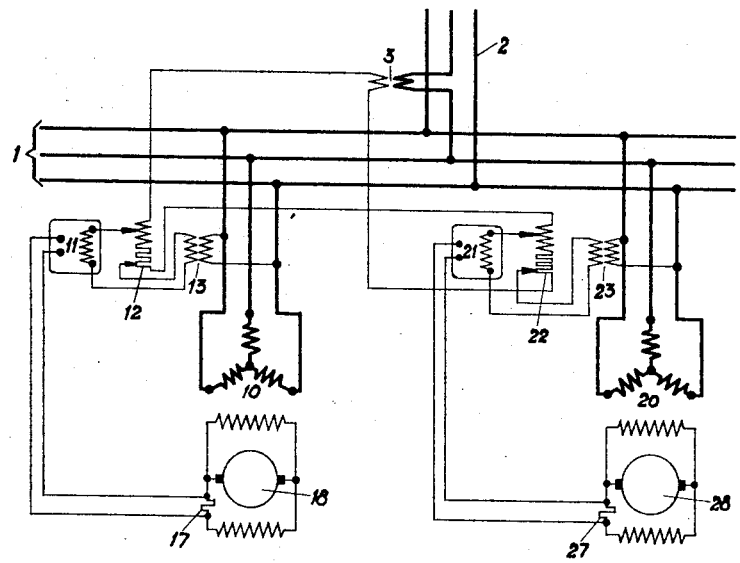
Figure 2:
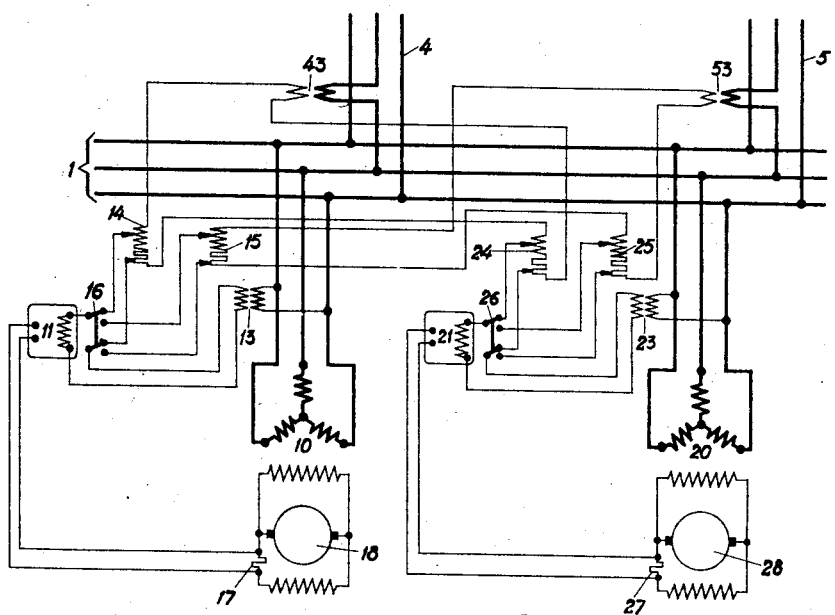

Two different forms of the invention are diagrammatically illustrated in the accompanying drawing in Figs. 1 and 2.

In Fig. 1, two generators 10, 20, respectively, operate on a bus bar system 1, and each generator is provided with an automatic voltage regulator 11, 21, respectively. The regulator is of the well-known kind acting to short-circuit intermittently a resistance 17, 27, respectively, in the field circuit of an exciter 18, 28, respectively, for the generator. The regulator is influenced by a voltage composed of the voltage from a potential transformer 13, 23, respectively, and the voltage from a compounding impedance 12, 22, respectively. The impedances are traversed in series by the current from a current transformer 3, connected in the outgoing line 2. The voltage regulators are preferably connected to regulating taps on the impedances whereby the compounding can be altered at will for keeping the voltage constant at any desired point of the line.

In Fig. 2, two lines 4, 5 are going out from the bus bar system 1, which is fed by two generators 10, 20, respectively, as in Fig. 1. In the line 4 there is a current transformer 43, and in the line 5 a current transformer 53. The current transformer 43 feeds a compounding impedance 14 for the regulator 11 of the generator 10 and in series therewith a compounding impedance 24 for the regulator 21 of the generator 20. In the same manner, the current transformer 53 feeds an impedance 15 for the regulator 11 and an impedance 25 for the regulator 21. By means of a change-over switch 16, 26, respectively, each regulator can be connected to the impedance for one or the other of the outgoing lines. Other details shown in Fig. 2 are the same as in Fig. 1 and marked by the same reference characters.

We claim as our invention:—

1. In electric power plants, a plurality of generators, potential transformers connected to the terminals of said generators, automatic voltage regulators acting on said generators, a bus bar system connecting together said generators, outgoing lines from said bus bar system, an impedance for each regulator traversed by a current proportional to the current in an outgoing line, said impedance being connected in series with the corresponding potential transformer to the corresponding voltage regulator.

2. In electric power plants, a plurality of generators, potential transformers connected to the terminals of said generators, automatic voltage regulators acting on said generators, a bus bar system connecting together said generators, a plurality of outgoing lines from said bus bar system, a plurality of impedances for each regulator, each traversed by a current proportional to the current in an outgoing line, and a change-over switch adapted to connect either impedance in series with the corresponding potential transformer to the corresponding voltage regulator.

3. In electric power plants, a plurality of generators, potential transformers connected to the terminals of said generators, automatic voltage regulators acting on said generators, a bus bar system connecting together said generators, outgoing lines from said bus bar system, an impedance for each regulator traversed by a current proportional to the current in an outgoing line, and adjustable taps on said impedance connected in series with the corresponding potential transformer to the voltage regulator.

In testimony whereof we have signed our names to this specification.

JARL KUUSINEN.
ARLE YTTERBERG.